US011967772B2

(12) United States Patent
Yang et al.

(10) Patent No.: US 11,967,772 B2
(45) Date of Patent: Apr. 23, 2024

(54) ANTENNA ROTATION STRUCTURE AND ELECTRONIC DEVICE

(71) Applicant: Wistron NeWeb Corporation, Hsinchu (TW)

(72) Inventors: Chih-Feng Yang, Hsinchu (TW); Chao-Chun Lin, Hsinchu (TW); Shih Fong Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 18/173,200

(22) Filed: Feb. 23, 2023

(65) Prior Publication Data

US 2024/0047868 A1 Feb. 8, 2024

(30) Foreign Application Priority Data

Aug. 8, 2022 (TW) .................................. 111129776

(51) Int. Cl.
*H01Q 3/06* (2006.01)
*H01Q 1/24* (2006.01)
*H01Q 1/42* (2006.01)

(52) U.S. Cl.
CPC ............... *H01Q 3/06* (2013.01); *H01Q 1/246* (2013.01); *H01Q 1/428* (2013.01)

(58) Field of Classification Search
CPC ........ H01Q 1/125; H01Q 1/246; H01Q 1/428; H01Q 3/02–08
See application file for complete search history.

(56) References Cited

U.S. PATENT DOCUMENTS

| | | | | |
|---|---|---|---|---|
| 7,345,646 B1 * | 3/2008 | Lin | H01Q 1/2258 | 248/536 |
| 10,707,551 B1 * | 7/2020 | Wu | H01Q 1/1221 | |
| 11,437,713 B2 * | 9/2022 | Kim | H01Q 19/104 | |
| 2002/0105477 A1 * | 8/2002 | Bragg | H01Q 19/13 | 343/890 |
| 2006/0192717 A1 * | 8/2006 | Kim | H01Q 3/20 | 343/766 |
| 2007/0164917 A1 * | 7/2007 | Takisawa | H01Q 1/1221 | 343/882 |

(Continued)

FOREIGN PATENT DOCUMENTS

CN 111355541 A 6/2020

*Primary Examiner* — Ab Salam Alkassim, Jr.
(74) *Attorney, Agent, or Firm* — McClure, Qualey & Rodack, LLP

(57) ABSTRACT

An antenna rotation structure includes a rotating shaft member rotatably disposed through a perforated groove of a housing, an annular member, and an elastic member. The rotating shaft member has a holding portion located in an accommodating space of the housing, a connecting portion connected to the holding portion and with an annular groove, and a gripping portion with one end connected to the connecting portion and the other end protruded from the housing. The annular member is disposed in the annular groove and abuts the perforated groove. The elastic member is sleeved on the one end of the gripping portion. The connecting portion and the one end of the gripping portion are disposed in the perforated groove. The gripping portion is turned to drive the rotating shaft member to rotate, thereby adjusting an angle of the antenna.

19 Claims, 8 Drawing Sheets

(56) References Cited

U.S. PATENT DOCUMENTS

| | | | | |
|---|---|---|---|---|
| 2007/0241979 | A1* | 10/2007 | Yang | H01Q 1/246 343/765 |
| 2009/0135074 | A1* | 5/2009 | Yang | F16H 1/227 343/766 |
| 2012/0280874 | A1* | 11/2012 | Kim | H01Q 3/06 343/763 |
| 2013/0120202 | A1* | 5/2013 | Lever | H01Q 3/04 343/766 |
| 2016/0276746 | A1* | 9/2016 | Mielke | H01Q 1/125 |
| 2018/0351248 | A1* | 12/2018 | Kim | H01Q 1/08 |
| 2021/0336321 | A1* | 10/2021 | Gierow | H01Q 3/08 |
| 2022/0094051 | A1* | 3/2022 | Ameer P | H01Q 21/26 |
| 2023/0103961 | A1* | 4/2023 | Lu | H01Q 3/06 343/872 |
| 2024/0047867 | A1* | 2/2024 | Yang | H01Q 3/06 |

* cited by examiner

ANTENNA ROTATION STRUCTURE AND ELECTRONIC DEVICE

CROSS-REFERENCE TO RELATED PATENT APPLICATION

This application claims the benefit of priority to Taiwan Patent Application No. 111129776, filed on Aug. 8, 2022. The entire content of the above identified application is incorporated herein by reference.

BACKGROUND

Technical Field

The present disclosure relates to an antenna rotation structure and an electronic device, and more particularly, to an antenna rotation structure and an electronic device that are waterproof.

Description of Related Art

Because 5G millimeter waves have low coverage, signals are more likely to be blocked due to topography during implementation, and so in different topography environments, the angle of the antenna is adjusted to prevent signals from being affected and weakened by topography. However, antenna in conventional electronic devices is usually a fixed structure, and the angle of the antenna cannot be adjusted from the inside of the housing but only can be adjusted by moving the footing of the electronic device from the outside.

In view of this, the development of an antenna rotation structure and an electronic device capable of adjusting the angle of the antenna from the outside of the housing is in dire need for the related industry.

SUMMARY

In one aspect, the present disclosure provides an antenna rotation structure configured to adjust an angle of an antenna from outside of a housing. The housing includes an accommodating space and a perforated groove. The antenna rotation structure includes a rotating shaft member, at least one annular member, and an elastic member. The rotating shaft member is rotatably disposed through the perforated groove and includes a holding portion, a connecting portion, and a gripping portion. The holding portion is located in the accommodating space. The connecting portion is connected to the holding portion and includes an annular groove. One end of the gripping portion is connected to the connecting portion, and another end of the gripping portion is protruded from the housing. The at least one annular member is disposed in the annular groove and abuts the perforated groove. The elastic member is sleeved on the one end of the gripping portion. The connecting portion and the one end of the gripping portion are disposed in the perforated groove. The gripping portion is turned to drive the rotating shaft member to rotate so as to adjust the angle of the antenna.

In another aspect, the present disclosure provides an electronic device that includes a housing, an antenna rotation structure, and an antenna. The housing includes an accommodating space and a perforated groove. The perforated groove is recessed from one side of the housing toward the accommodating space. The antenna rotation structure includes a rotating shaft member, at least one annular member, and an elastic member. The rotating shaft member is rotatably disposed through the perforated groove and includes a holding portion, a connecting portion, and a gripping portion. The holding portion is located in the accommodating space, and the connecting portion is connected to the holding portion and includes an annular groove. One end of the gripping portion is connected to the connecting portion, and another end of the gripping portion is protruded from the housing. The at least one annular member is disposed in the annular groove and abuts the perforated groove. The elastic member is sleeved on the one end of the gripping portion. The antenna is disposed on the holding portion. The connecting portion and the one end of the gripping portion are disposed in the perforated groove. The gripping portion turns to drive the rotating shaft member to rotate so as to adjust an angle of the antenna.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
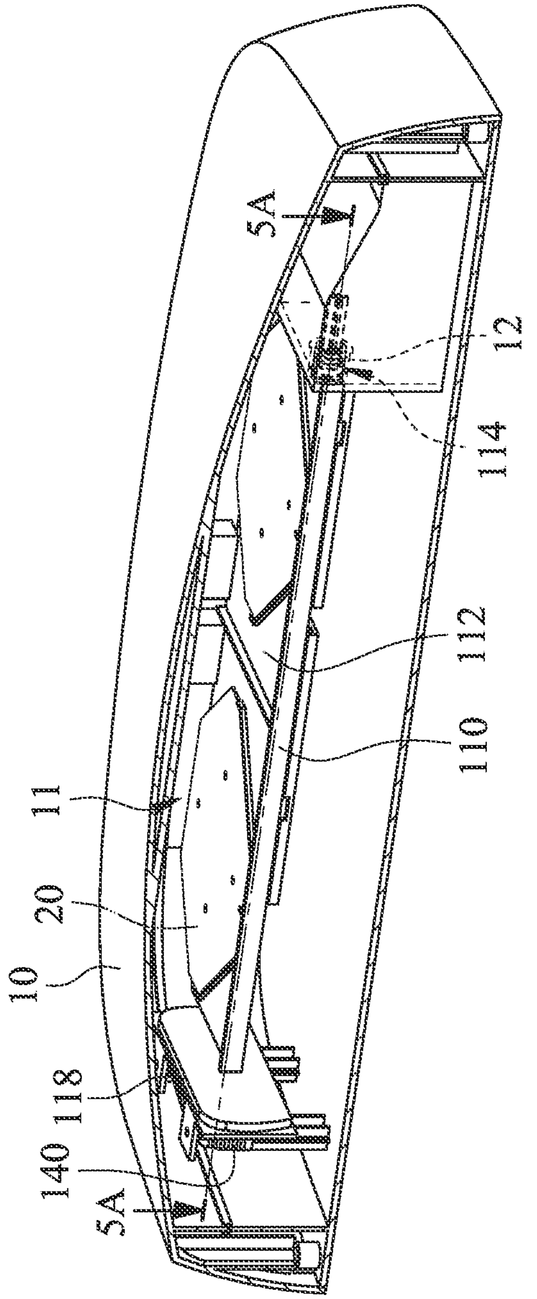
FIG. 1 is a side view of an antenna rotation structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
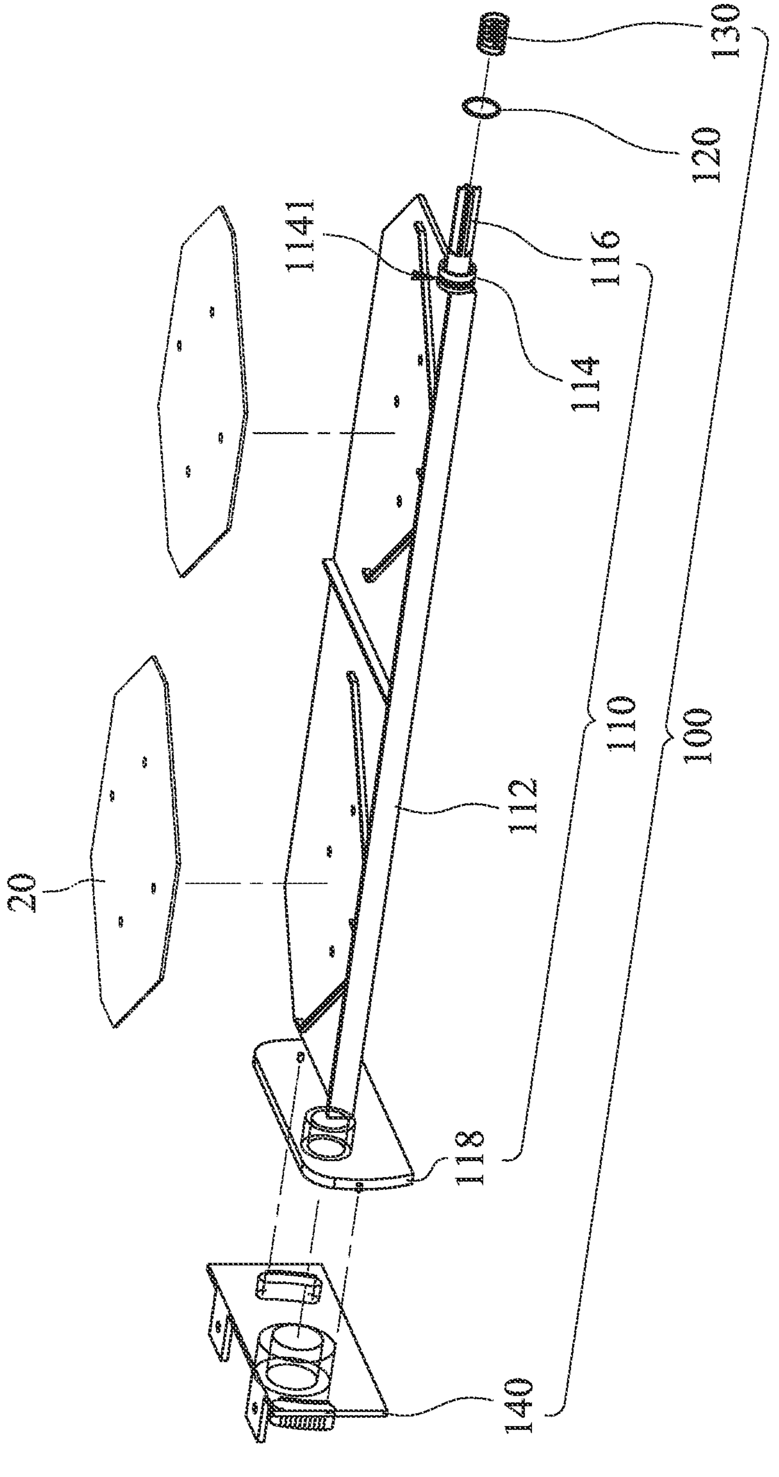
FIG. 2 is an exploded view of the antenna rotating structure according to the embodiment shown in FIG. 1.

Referring to FIG. 1 and FIG. 2. FIG. 1 is a side view of an antenna rotation structure 100 according to a first embodiment of the present disclosure. FIG. 2 is an exploded view of the antenna rotating structure 100 according to the embodiment shown in FIG. 1. The antenna rotation structure 100 is configured to adjust an angle of an antenna 20 from the outside of a housing 10. The housing 10 includes an accommodating space 11 and a perforated groove 12. The antenna rotation structure 100 includes a rotating shaft member 110, at least one annular member 120, and an elastic member 130. The rotating shaft member 110 is rotatably disposed through the perforated groove 12, and includes a holding portion 112, a connecting portion 114, and a gripping portion 116. The holding portion 112 is located in the accommodating space 11. The connecting portion 114 is connected to the holding portion 112 and includes an annular groove 1141. One end of the gripping portion 116 is connected to the connecting portion 114, and the other end of the gripping portion 116 is protruded from the housing 10. The at least one annular member 120 is disposed in the annular groove 1141 and abuts the perforated groove 12. The elastic member 130 is sleeved on the one end of the gripping portion 116. The connecting portion 114 and the one end of the gripping portion 116 are both disposed in the perforated groove 12. The gripping portion 116 is turned/rotated, which drives the rotating shaft member 110 to rotate, so as to adjust the angle of the antenna 20. Thus, the antenna rotation structure 100 of the present disclosure is able to adjust the angle of the antenna carried/held by the antenna rotation structure 100 from the outside of the housing 10 and remain waterproof through the process.

In specific, the holding portion 112 is configured to place and hold/carry the antenna 20. The connecting portion 114 and a part of the gripping portion 116 are disposed in the perforated groove 12 of the housing 10. The other part of the gripping portion 116 is located on the outside of the housing 10. The gripping portion 116 has a cross shape for increasing the friction force during gripping.

Figure 3:
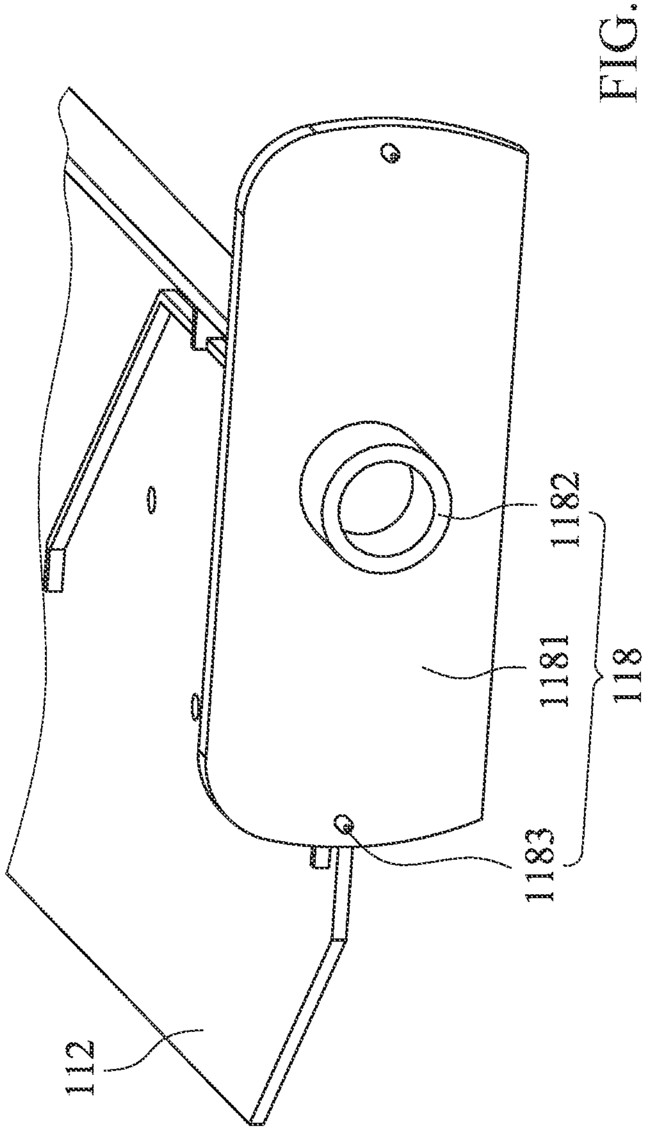
FIG. 3 is a schematic diagram illustrating an angle fixing board of the antenna rotation structure according to the embodiment shown in FIG. 1.

Referring to FIG. 1 to FIG. 3. FIG. 3 is a schematic diagram illustrating an angle fixing board 118 of the antenna rotation structure 100 according to the embodiment shown in FIG. 1. The rotating shaft member 110 can further include an angle fixing board 118. The angle fixing board 118 includes a board member 1181, a first circular column 1182, and at least one stud 1183. One side of the board member 1181 is connected to the holding portion 112. The first circular column 1182 is disposed at a center of the board member 1181 and protrudes from another side of the board member 1181. The at least one stud 1183 protrudes from the another side of the board member 1181. In other words, the end of the rotating shaft member 110 away from the perforated groove 12 further includes the angle fixing board 118. The first circular column 1182 and the stud 1183 are both disposed on the side of the board member 1181 that is away from the holding portion 112. In this embodiment, the first circular column 1182 is a hollow circular column or a circular tubular column protruding from the board member 1181, the number of the at least one stud 1183 is two, and each of the studs 1183 is a circular column protruding from the board member 1181, but the present disclosure is not limited thereby.

Figure 4:
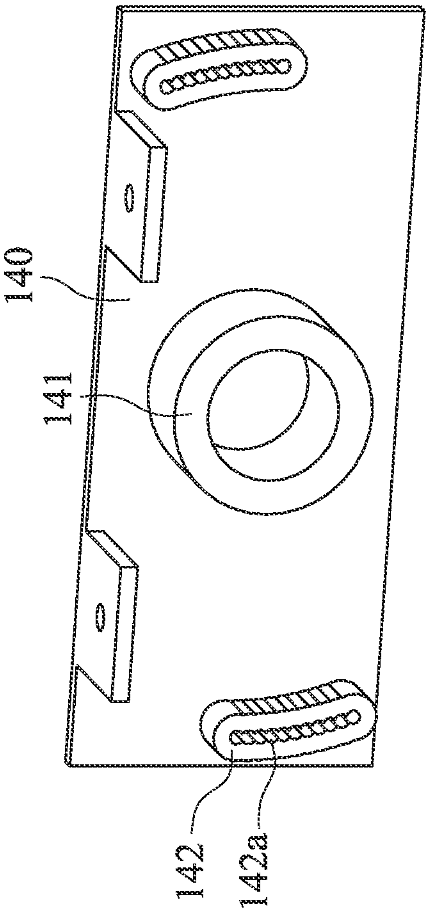
FIG. 4 is a schematic diagram illustrating a holding board of the antenna rotation structure according to the embodiment shown in FIG. 1.

Referring to FIG. 1 to FIG. 4. FIG. 4 is a schematic diagram illustrating a holding board 140 of the antenna rotation structure 100 according to the embodiment shown in FIG. 1. The antenna rotation structure 100 can further include a holding board 140. The holding board 140 includes a second circular column 141 and at least one void 142. More specifically, the holding board 140 and the angle fixing board 118 are pivotally connected, and the second circular column 141 and the at least one void 142 protrude from the side of the holding board 140 that is away from the angle fixing board 118. In this embodiment, the second circular column 141 is a hollow circular column or a circular tubular column protruding, the number of the at least one stud 1183 is two, the two studs 1183 are respectively disposed on two sides of the first circular column 1182, the number of the at least one void 142 is two, and each of the two voids 142 includes a plurality of restricting structures **142*a* for restricting/holding each of the two studs 1183** to the position/in place, but the present disclosure is not limited thereby.

Figure 5A:
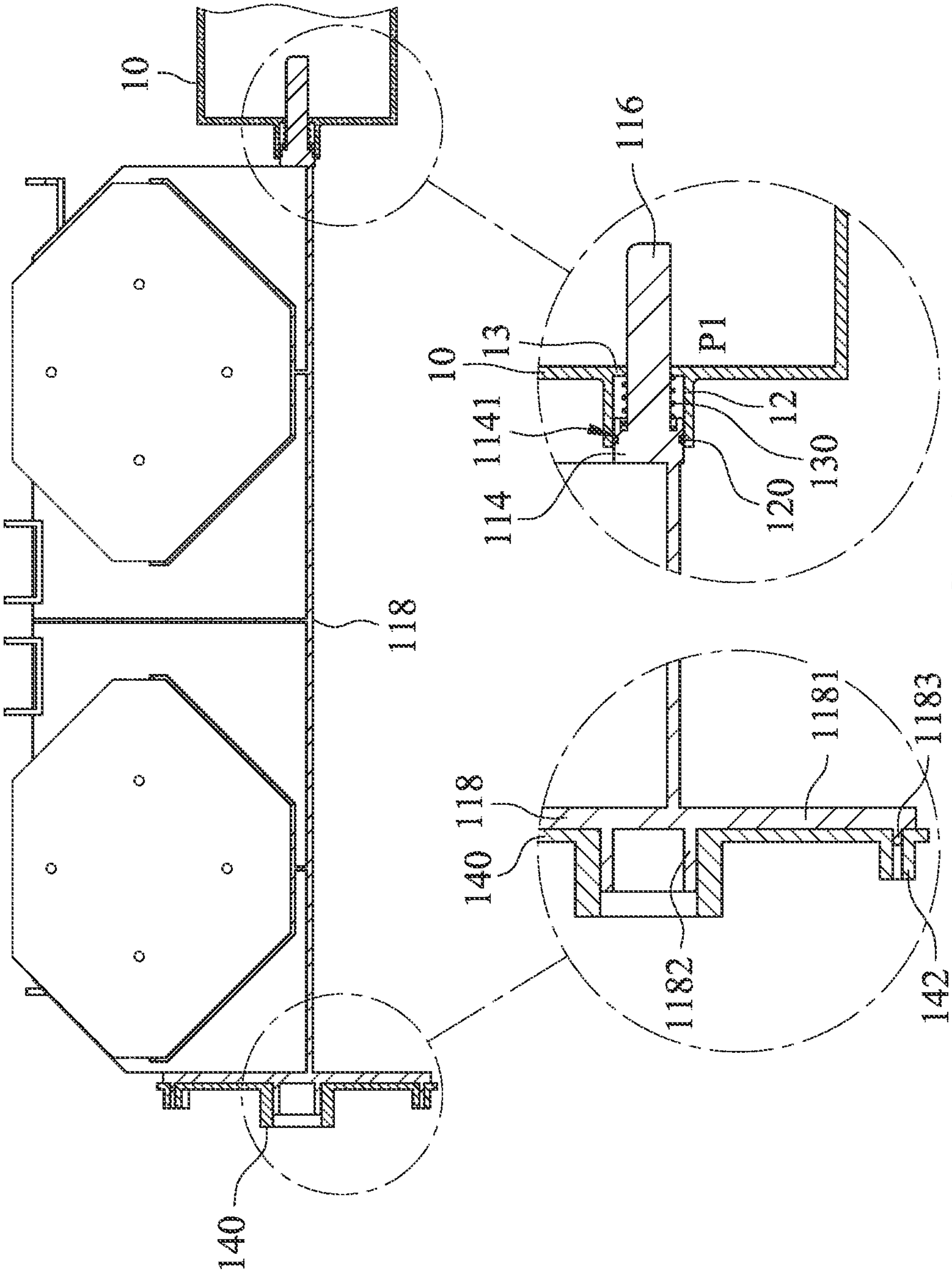
FIG. 5A is a cross-sectional view of a rotating shaft member of the antenna rotation structure at a first position taken along line 5A-5A of FIG. 1.
Figure 5B:
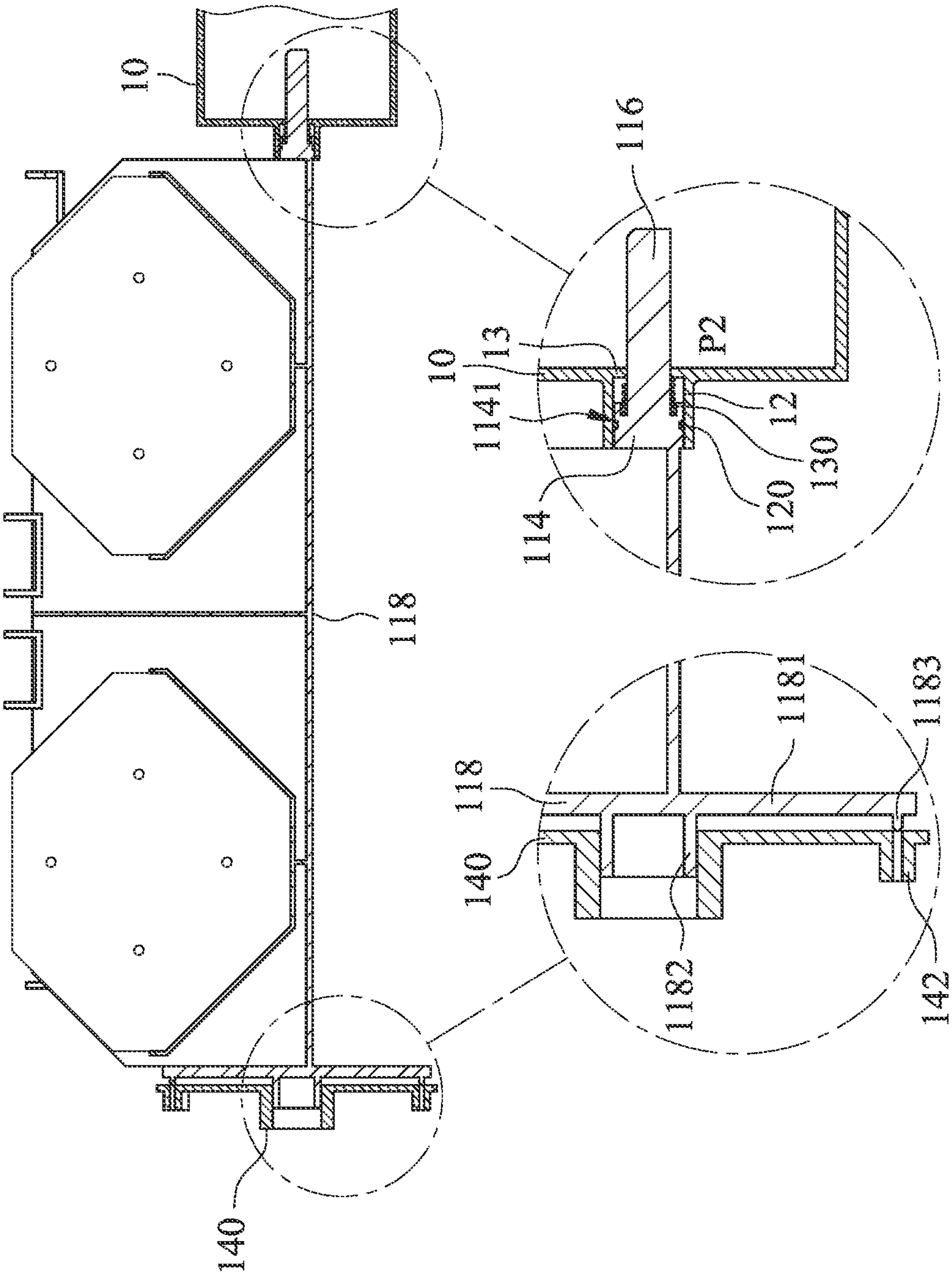
FIG. 5B is a cross-sectional view of the rotating shaft member of the antenna rotation structure at a second position taken along line 5A-5A of FIG. 1.

Referring to FIG. 1 to FIG. 5B. FIG. 5A is a cross-sectional view of a rotating shaft member 110 of the antenna rotation structure 100 at a first position P1 taken along line 5A-5A of FIG. 1. FIG. 5B is a cross-sectional view of the rotating shaft member 110 of the antenna rotation structure 100 at a second position P2 taken along line 5A-5A of FIG. 1. The rotating shaft member 110 is slidable relative to the housing 10 between a first position P1 and a second position P2, in other words, the rotating shaft member 110 is slidably restricted relative to the housing 10 between the first position P1 and the second position P2. When the rotating shaft member 110 is located at the first position P1 as shown in FIG. 5A, the elastic member 130 is in a relaxed state, the angle fixing board 118 abuts against the holding board 140, and the at least one stud 1183 is engaged with or wedged in the at least one void 142. When the rotating shaft member 110 is located at the second position P2 as shown in FIG. 5B, the elastic member 130 is compressed by the connecting portion 114 and in a compressed state, there is a gap between the angle fixing board 118 and the holding board 140, and the at least one stud 1183 is away from the at least one void 142.

Furthermore, when the rotating shaft member 110 is not pulled by the external force, the rotating shaft member 110 is normally located at the first position P1, and only when being pulled by the external force to adjust the angle, the rotating shaft member 110 is located at the second position P2. It can be seen from FIG. 5A and FIG. 5B that the annular member 120 remains closely fitted between the perforated groove 12 and the annular groove 1141 regardless of the rotating shaft member 110 being located at the first position P1 or the second position P2. Thus, in the antenna rotation structure 100 of the present disclosure, through filling the gap between the perforated groove 12 and annular groove 1141 with the annular member 120, a closed accommodating space 11 is formed inside the housing 10 even when the angle of the antenna 20 is being adjusted by the antenna rotation structure 100 from the outside of the housing 10, and so liquid or dust in the external environment of the housing 10 are prevented from entering the accommodating space 11.

In other embodiments, the number of at least one annular member is plural; one of the plurality of annular members is disposed in the annular groove, and the other one of the plurality of annular members is disposed at the connecting portion. Hence, through the plurality of annular members, the antenna rotation structure of the present disclosure is able to enhance the tightness between the perforated groove and the annular groove.

In this embodiment, the connecting portion 114 has a first outer diameter, the gripping portion 116 has a second outer diameter, and the second outer diameter is smaller than the first outer diameter. The end of the perforated groove 12 that is away from the accommodating space 11 has a blocking structure 13, and the connecting portion 114 is confined to the perforated groove 12 by the blocking structure 13.

Figure 6:
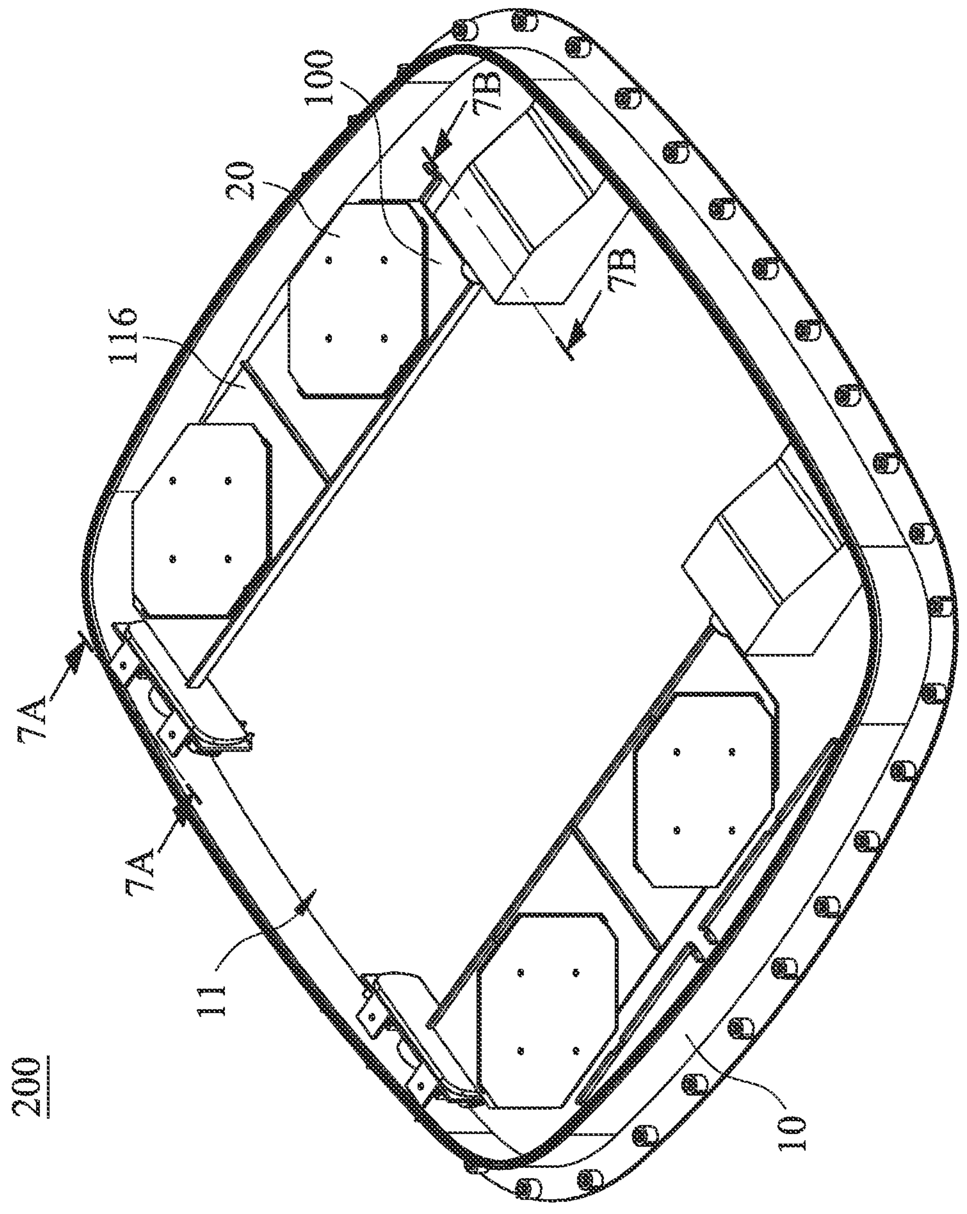
FIG. 6 is a schematic view of an electronic device according to a second embodiment of the present disclosure.
Figure 7A:
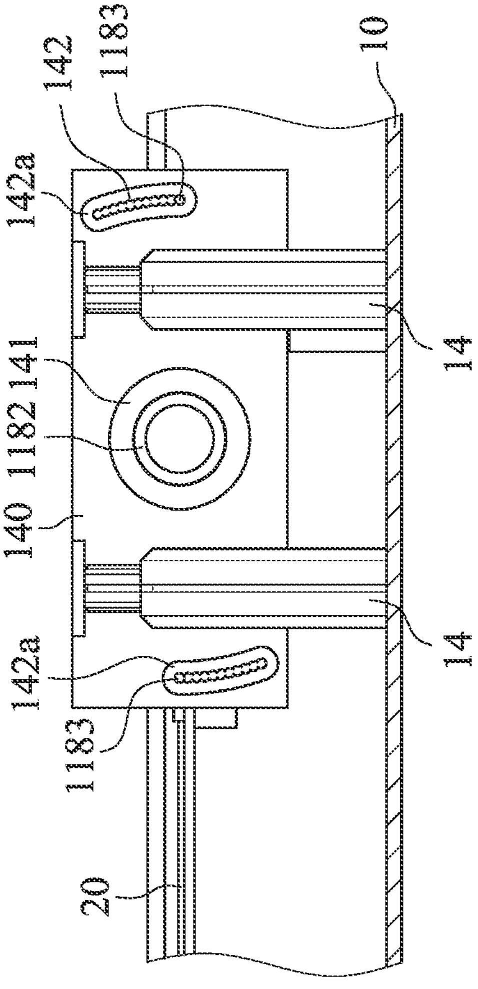
FIG. 7A is a cross-sectional view of a rotating shaft member of an antenna rotation structure in the electronic device at 0-degree angle taken along line 7A-7A of FIG. 6.
Figure 7B:
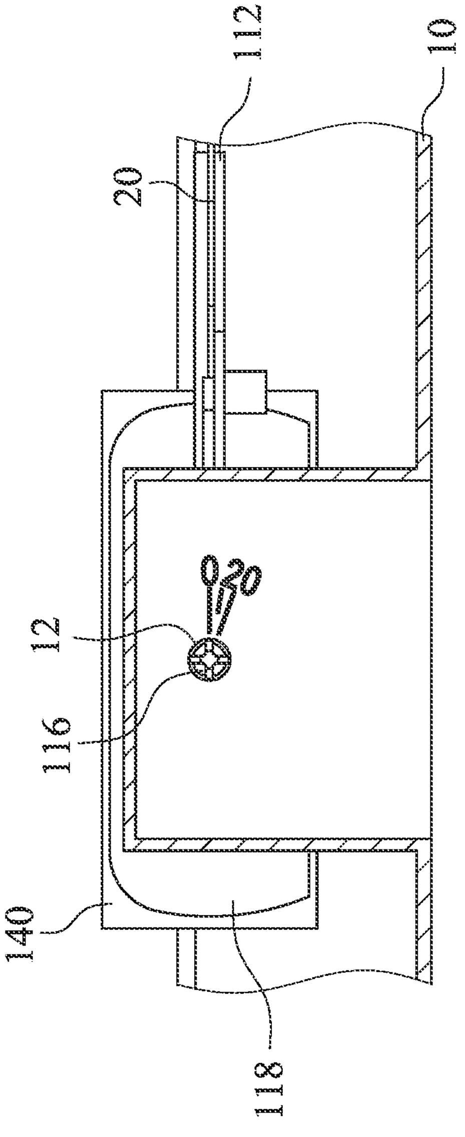
FIG. 7B is a cross-sectional view of the rotating shaft member of the antenna rotation structure in the electronic device at 0-degree angle taken along line 7B-7B of FIG. 6.

Referring to FIG. 1 and FIG. 6 to FIG. 7B. FIG. 6 is a schematic view of an electronic device 200 according to a second embodiment of the present disclosure. FIG. 7A is a cross-sectional view of a rotating shaft member 110 of an antenna rotation structure 100 in the electronic device 200 at 0-degree angle taken along line 7A-7A of FIG. 6. FIG. 7B is a cross-sectional view of the rotating shaft member 110 of the antenna rotation structure 100 in the electronic device 200 at 0-degree angle taken along line 7B-7B of FIG. 6. The electronic device 200 includes a housing 10, an antenna rotation structure 100, and an antenna 20. The perforated groove 12 is recessed toward the accommodating space 11 from one side of the housing 10. The antenna rotation structure 100 can be the antenna rotation structure 100 of FIG. 2 and will not be described herein. The antenna 20 is disposed on the holding portion 112. In this embodiment, the number of antenna rotation structure 100 is plural, namely two, and the adjustable angle of the antenna 20 is greater than or equal to 0 degree and less than or equal to 20 degrees, but the present disclosure is not limited thereto.

In particular, the housing 10 can further include a holding structure 14, and the holding board 140 is fixed to the holding structure 14 of the housing 10. When the angle of the antenna 20 is at 0 degree, the positional relationship between the angle fixing board 118 and the holding board 140 is as shown in FIG. 7A and FIG. 7B, where the two studs 1183 of the angle fixing board 118 are respectively restricted/limited by the bottom restricting structure 142*a* of the void 142 on the right side and to the top restricting structure 142*a* of the void 142 on the left side.

Figure 8A:
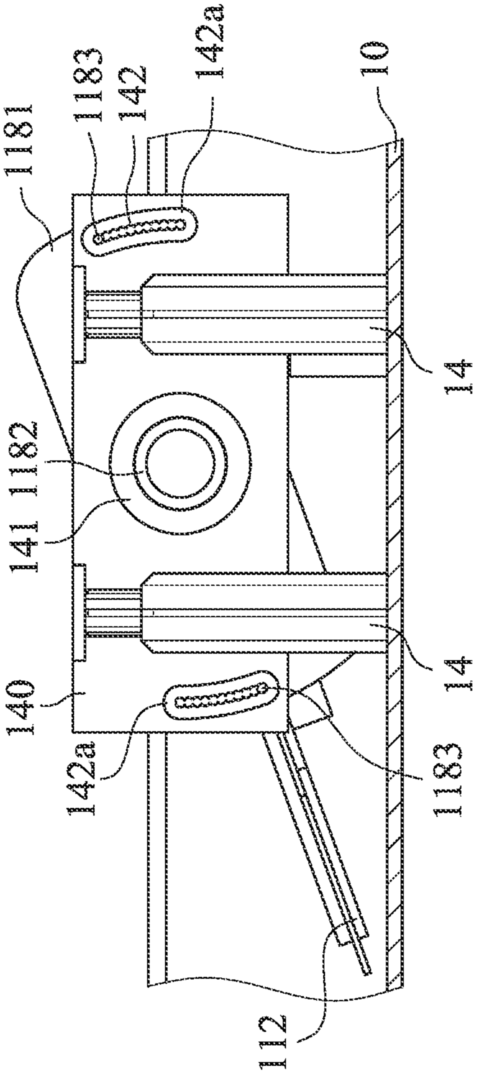
FIG. 8A is a cross-sectional view of the rotating shaft member of the antenna rotation structure in the electronic device at 20-degree angle taken along line 7A-7A of FIG. 6.
Figure 8B:
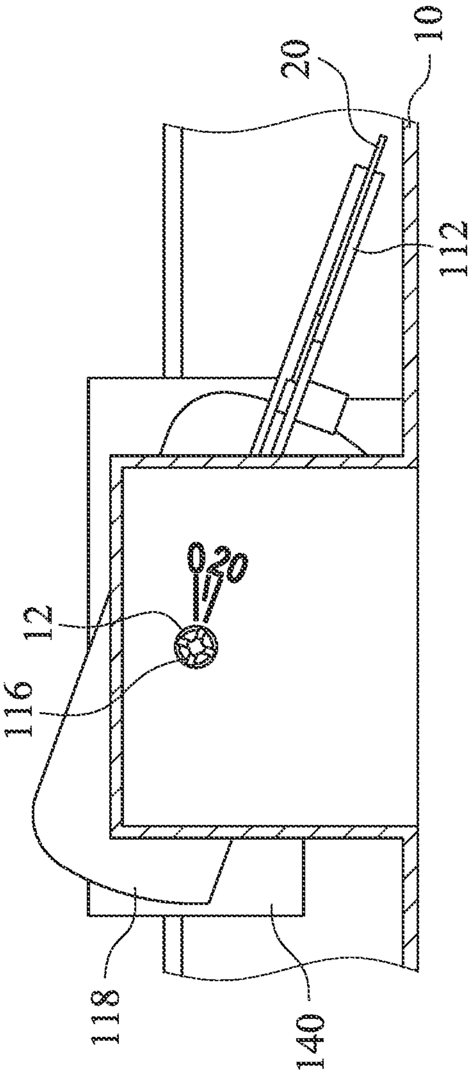
FIG. 8B is a cross-sectional view of the rotating shaft member of the antenna rotation structure in the electronic device at 20-degree angle taken along line 7B-7B of FIG. 6.

Referring to FIG. 6, FIG. 8A and FIG. 8B. FIG. 8A is a cross-sectional view of the rotating shaft member 110 of the antenna rotation structure 100 in the electronic device 200 at 20-degree angle taken along line 7A-7A of FIG. 6. FIG. 8B is a cross-sectional view of the rotating shaft member 110 of the antenna rotation structure 100 in the electronic device 200 at 20-degree angle taken along line 7B-7B of FIG. 6. The angle of the antenna 20 in the electronic device 200 is adjusted 20 degrees by the antenna rotation structure 100.

More particularly, when the antenna 20 is at 20-degree angle, the positional relationship between the angle fixing board 118 and the holding board 140 is as shown in FIG. 8A and FIG. 8B, where the two studs 1183 of the angle fixing board 118 are respectively restrained/constrained by the upper most restricting structure 142*a* of the void 142 on the right side and by the lower most restricting structure 142*a* of the void 142 on the left side.

It can be seen from FIG. 7A and FIG. 8A that when the angle is adjusted from 0 degree to 20 degrees, the rotating shaft member 110 rotates around the center of the first circular column 1182, and by engaging the stud 1183 with the restricting structure 142*a* in the void 142 that corresponds to specific angle, the rotating shaft member 110 is held at a specific angle position, which in turn drives the antenna 20 that is placed on the holding portion 112 to rotate.

Therefore, in the electronic device 200 of the present disclosure, the antenna rotation structure 100 is disposed inside the housing 10, and a closed space is formed inside the housing 10 through the annular member 120, such that the electronic device 200 is suitable for use in an underwater environment.

In view of the above, the antenna rotation structure and the electronic device of the present disclosure embody the following advantages: first, the angle of the antenna carried by the antenna rotation structure can be adjusted from the outside of the housing; second, the gap between the perforated groove and the annular groove is filled by the annular member, such that a closed accommodating space is formed inside the housing even when the angle of the antenna is being adjusted by the antenna rotation structure from the outside of the housing; third, the tightness between the perforated groove and the annular groove is enhanced through a plurality of annular members; and fourth, the antenna rotation structure is disposed inside the housing and a closed space is formed inside the housing through the annular member, thereby rendering the electronic device suitable for use underwater.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna rotation structure for adjusting an angle of an antenna from outside of a housing, the housing comprising an accommodating space and a perforated groove, the antenna rotation structure comprising:

a rotating shaft member rotatably disposed through the perforated groove and comprising:

a holding portion located in the accommodating space;

a connecting portion connected to the holding portion and comprising an annular groove; and a gripping portion, wherein one end of the gripping portion is connected to the connecting portion, and another end of the gripping portion is protruded from the housing;

at least one annular member disposed in the annular groove and abutting the perforated groove; and an elastic member sleeved on the one end of the gripping portion;

wherein the connecting portion and the one end of the gripping portion are disposed in the perforated groove, and the gripping portion is turned to drive the rotating shaft member to rotate so as to adjust the angle of the antenna.

2. The antenna rotation structure according to claim 1, wherein the rotating shaft member further comprises:

an angle fixing board comprising:

a board member, wherein one side of the board member is connected to the holding portion;

a first circular column disposed at a center of the board member and protruding from another side of the board member; and at least one stud protruding from the another side of the board member.

3. The antenna rotation structure according to claim 2, further comprising:

a holding board comprising:

a second circular column corresponding to the first circular column; and at least one void configured to hold the at least one stud.

4. The antenna rotation structure according to claim 3, wherein the rotating shaft member is slidable relative to the housing between a first position and a second position; when the rotating shaft member is at the first position, the elastic member is in a relaxed state, the angle fixing board abuts against the holding board, and the at least one stud is engaged with the at least one void, and when the rotating shaft member is at the second position, the elastic member is pressed by the connecting portion and in a compressed state, there is a gap between the angle fixing board and the holding board, and the at least one stud is away from the at least one void.

5. The antenna rotation structure according to claim 3, wherein a number of the at least one stud is two, the two studs are respectively disposed on two sides of the first circular column; and a number of the at least one void is two, and each of the two voids comprises a plurality of restricting structures to hold each of the two studs in place.

6. The antenna rotation structure according to claim 1, wherein the holding portion holds the antenna, and the gripping portion is turned to drive the holding portion rotate to adjust the angle of the antenna.

7. The antenna rotation structure according to claim 1, wherein the gripping portion comprises a cross shape.

8. The antenna rotation structure according to claim 1, wherein a number of the at least one annular member is plural, one of the plurality of annular members is disposed in the annular groove, and another one of the plurality of annular members is disposed at the connecting portion.

9. The antenna rotation structure according to claim 1, wherein the connecting portion comprises a first outer diameter, the gripping portion comprises a second outer diameter, and the second outer diameter is smaller than the first outer diameter.

10. The antenna rotation structure according to claim 1, wherein the angle is greater than or equal to 0 degree and less than or equal to 20 degrees.

11. An electronic device comprising:

a housing comprising:

an accommodating space; and a perforated groove configured to recess from one side of the housing toward the accommodating space;

an antenna rotation structure comprising:

a rotating shaft member rotatably disposed through the perforated groove and comprising:

a holding portion located in the accommodating space;

a connecting portion connected to the holding portion and comprising an annular groove; and a gripping portion, wherein one end of the gripping portion is connected to the connecting portion, and another end of the gripping portion is protruded from the housing;

at least one annular member disposed in the annular groove and abutting the perforated groove; and an elastic member sleeved on the one end of the gripping portion; and an antenna disposed on the holding portion;

wherein the connecting portion and the one end of the gripping portion are disposed in the perforated groove, the gripping portion is turned to drive the rotating shaft member to rotate so as to adjust an angle of the antenna.

12. The electronic device according to claim 11, wherein the rotating shaft member further comprises:

an angle fixing board comprising:

a board member, wherein one side of the board member is connected to the holding portion;

a first circular column disposed at a center of the board member and protruding from another side of the board member; and at least one stud protruding from the another side of the board member.

13. The electronic device according to claim 12, wherein the antenna rotation structure further comprises:

a holding board fixed to the housing and comprising:

a second circular column corresponding to the first circular column; and at least one void configured to hold the at least one stud.

14. The electronic device according to claim 13, wherein the rotating shaft member is slidable relative to the housing between a first position and a second position; when the rotating shaft member is at the first position, the elastic member is in a relaxed state, the angle fixing board abuts against the holding board, and the at least one stud is engaged with the at least one void, and when the rotating shaft member is at the second position, the elastic member is pressed by the connecting portion and in a compressed state, there is a gap between the angle fixing board and the holding board, and the at least one stud is away from the at least one void.

15. The electronic device according to claim 13, wherein a number of the at least one stud is two, the two studs are respectively disposed on two sides of the first circular column; and a number of the at least one void is two, and each of the two voids comprises a plurality of restricting structures to hold each of the two studs in place.

16. The electronic device according to claim 11, wherein the gripping portion comprises a cross shape.

17. The electronic device according to claim 11, wherein a number of the at least one annular member is plural, one of the plurality of annular members is disposed in the annular groove, and another one of the plurality of annular members is disposed at the connecting portion.

18. The electronic device according to claim 11, wherein the connecting portion comprises a first outer diameter, the gripping portion comprises a second outer diameter, and the second outer diameter is smaller than the first outer diameter.

19. The electronic device according to claim 11, wherein the angle is greater than or equal to 0 degree and less than or equal to 20 degrees.

* * * * *